United States Patent
Keller et al.

(10) Patent No.: US 8,537,167 B1
(45) Date of Patent: Sep. 17, 2013

(54) METHOD AND SYSTEM FOR USING BUNDLE DECODERS IN A PROCESSING PIPELINE

(75) Inventors: Robert C. Keller, Palo Alto, CA (US); Richard A. Silkebakken, Santa Clara, CA (US); Matthew J. P. Regan, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 1505 days.

(21) Appl. No.: 11/550,227

(22) Filed: Oct. 17, 2006

(51) Int. Cl.
*G06T 1/20* (2006.01)
*G06F 15/16* (2006.01)
*G06F 9/46* (2006.01)

(52) U.S. Cl.
USPC .......................... 345/506; 345/502; 718/108

(58) Field of Classification Search
USPC ................. 345/506; 712/228; 718/107, 108
See application file for complete search history.

(56) References Cited

U.S. PATENT DOCUMENTS

| | | | |
|---|---|---|---|
| 6,259,461 B1* | 7/2001 | Brown | 345/556 |
| 6,738,892 B1* | 5/2004 | Coon et al. | 712/24 |
| 2002/0002667 A1* | 1/2002 | Kelsey et al. | 712/228 |
| 2004/0130927 A1* | 7/2004 | Schulz et al. | 365/145 |
| 2007/0101108 A1* | 5/2007 | Grossman et al. | 712/228 |
| 2007/0103474 A1* | 5/2007 | Huang et al. | 345/506 |

* cited by examiner

*Primary Examiner* — Joni Richer
(74) *Attorney, Agent, or Firm* — Patterson & Sheridan, L.L.P.

(57) ABSTRACT

A method and system for using bundle decoders in a processing pipeline is disclosed. In one embodiment, to perform a context switch between a first process and a second process operating in a processing pipeline, the first state information that is associated with the first process is placed on a connection separate from the processing pipeline. A number of decoders are coupled to this connection. The decoders obtain the first state information from a number of pipeline units on the processing pipeline by monitoring the data stream going into these pipeline units. Also, to restore the first state information after having switched out the second state information that is associated with the second process, the first state information is placed on the connection for the decoders to retrieve.

20 Claims, 6 Drawing Sheets

METHOD AND SYSTEM FOR USING BUNDLE DECODERS IN A PROCESSING PIPELINE

BACKGROUND OF THE INVENTION

1. Field of the Invention

Embodiments of the present invention relate generally to graphics applications and more specifically to a method and system for using bundle decoders in a processing pipeline.

2. Description of the Related Art

Unless otherwise indicated herein, the approaches described in this section are not prior art to the claims in this application and are not admitted to be prior art by inclusion in this section.

A context switch is a feature of a multitasking operating system that allows for a switch in execution from one computing thread or process to another. This feature ensures that a processor cannot be monopolized by any one processor-intensive thread or process. During a context switch, the states of the processor of the currently running process are stored in memory, and the processor is switched to states of another process that were previously stored in memory.

Figure 1:
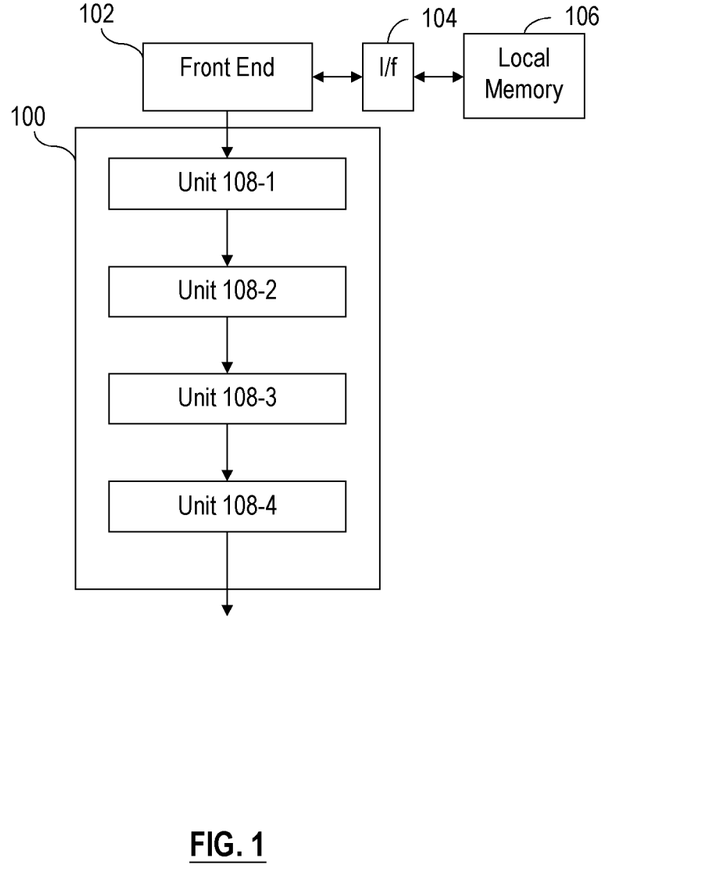
FIG. 1 is a simplified diagram of a processing pipeline including a number of pipeline units.

In graphics applications, a number of threads may be processed concurrently through one or more graphics pipelines that are managed by a graphics processing unit ("GPU"). FIG. 1 is a simplified block diagram of processing pipeline 100 that includes pipeline units 108-1, 108-2, and 108-3 (collectively referred to as pipeline units 108). FIG. 1 also shows front end ("FE") 102, which manages the context switch operation for processing pipeline 100 by sending information via "bundles" to the various pipeline units. A "bundle" is a data structure that contains a header, which indicates the intended destination for the bundle, and payload, which contains information such as state information or trigger information for a pipeline unit. To illustrate, suppose FE 102 sends three versions of a bundle, B0, at three different times, time 1, time 2, and time 3. The version at time 1, also denoted as B0(time 1), contains state A; B0(time 2) contains state B; and B0(time 3) contains state C. Thus, as the three versions of B0 flow down processing pipeline 100, it is possible that at time 3, B0(time 1) has reached pipeline unit 108-3; B0(time 2) has reached pipeline unit 108-2 but has not reached pipeline unit 108-3; and B0(time 3) has reached pipeline unit 108-1 but has not reached pipeline unit 108-2. In this scenario, pipeline units 108-1, 108-2, and 108-3 have states C, B, A, respectively. In other words, as the different versions of bundle B0 flow down processing pipeline 100, state information that is previously stored in pipeline units 108 is rewritten with the state information stored in these different versions of B0.

According to the wait-for-idle ("WFI") protocol, when FE 102 receives a context switch command, FE 102 suspends sending commands down processing pipeline 100 and then waits for an idle status signal from each of pipeline units 108. A context switch occurs only after FE 102 receives these idle status signals. During this idle period, all the bundles in flight in processing pipeline 100 are completely drained. Using the example discussed above, all three versions of B0 are drained by reaching pipeline unit 108-3. As a result, each of pipeline units 108 has state C. To proceed with the context switch, rather than retrieving and storing state C from each of pipeline units 108, FE 102 maintains a shadow copy of the last state that it encapsulates in a bundle and sends down processing pipeline 100 in a memory region reserved for the context associated with the currently running process. In this example, the last state is state C. Then, FE 102 switches processing pipeline 100 to the context associated with another process after that context is retrieved from a memory region reserved for that context. Each of these reserved memory regions resides in memory 106 and is accessed through memory interface 104.

As shown above, the aforementioned WFI protocol does not provide FE 102 with the flexibility to proceed with a context switch operation when there are bundles in flight in processing pipeline 100. Using the example above, FE 102 cannot switch the context of processing pipeline 100 at time 3 in accordance with the WFI protocol, because at time 3 pipeline units 108-1, 108-2, and 108-3 do not yet have the same state information. In addition, current implementations of processing pipeline 100 fail to impose uniformity on the formats and processing of the bundles. Again using the example discussed above, this lack of uniformity may result in FE 102 not recognizing and therefore not utilizing B0 after the bundle flows down processing pipeline 100 and is operated on by various pipeline units 108. Another drawback of the current approach to context switching is that using shadow copies to track the information needed for context switch operations is costly due to the additional storage space and computational overhead necessary to maintain and manage the shadow copies.

As the foregoing illustrates, what is needed is a way to intelligently manage the bundles in a processing pipeline to improve the efficiency of switching the context of the processing pipeline and thereby enhancing the overall performance of the processing pipeline.

SUMMARY OF THE INVENTION

A method and system for using bundle decoders in a processing pipeline is disclosed. In one embodiment, to perform a context switch between a first process and a second process operating in a processing pipeline, the first state information that is associated with the first process is placed on a connection separate from the processing pipeline. A number of decoders are coupled to this connection. The decoders obtain the first state information from a number of pipeline units on the processing pipeline by monitoring the data stream going into these pipeline units. Also, to restore the first state information after having switched out the second state information that is associated with the second process, the first state information is placed on the connection for the decoders to retrieve.

One advantage of the disclosed method and system is that a context switch can be performed without waiting for the idling condition of a processing pipeline, thereby enhancing the flexibility and performance of the processing pipeline. Further, shadow copies of the pipeline state do not have to be maintained and managed by the front end unit with the disclosed approach.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and system for using bundle decoders in a processing pipeline is described. In the following description, for the purposes of explanation, numerous specific details are set forth in order to provide a thorough understanding of the present invention. It will be apparent, however, to one skilled in the art that the present invention may be practiced without these specific details.

Throughout this disclosure, a "bundle" generally refers to a data structure, which a processing pipeline, such as processing pipeline 100 shown in FIG. 1, uses to transmit information to the various units of the pipeline. This information, in one instance, refers to the state information in a pipeline stage, and such state information is at the Application Programming Interface ("API") level. In graphics applications, some examples of the API include OpenGL and DirectX. A bundle encapsulating such API-level state information is referred to as a "state bundle." API-level state information follows the naming conventions and initialization and default values specified by the API. In another instance, the information in a bundle could trigger a pipeline unit to perform certain actions. A bundle encapsulating such trigger information is referred to as a "trigger bundle." The term "bundle decoder" is used interchangeably with "decoder" in this disclosure. In addition, each processing pipeline "stage" may include one or more processing pipeline "units." To avoid unnecessarily obscuring the present invention, unless otherwise indicated, each stage is assumed to include one pipeline unit.

Figure 2:
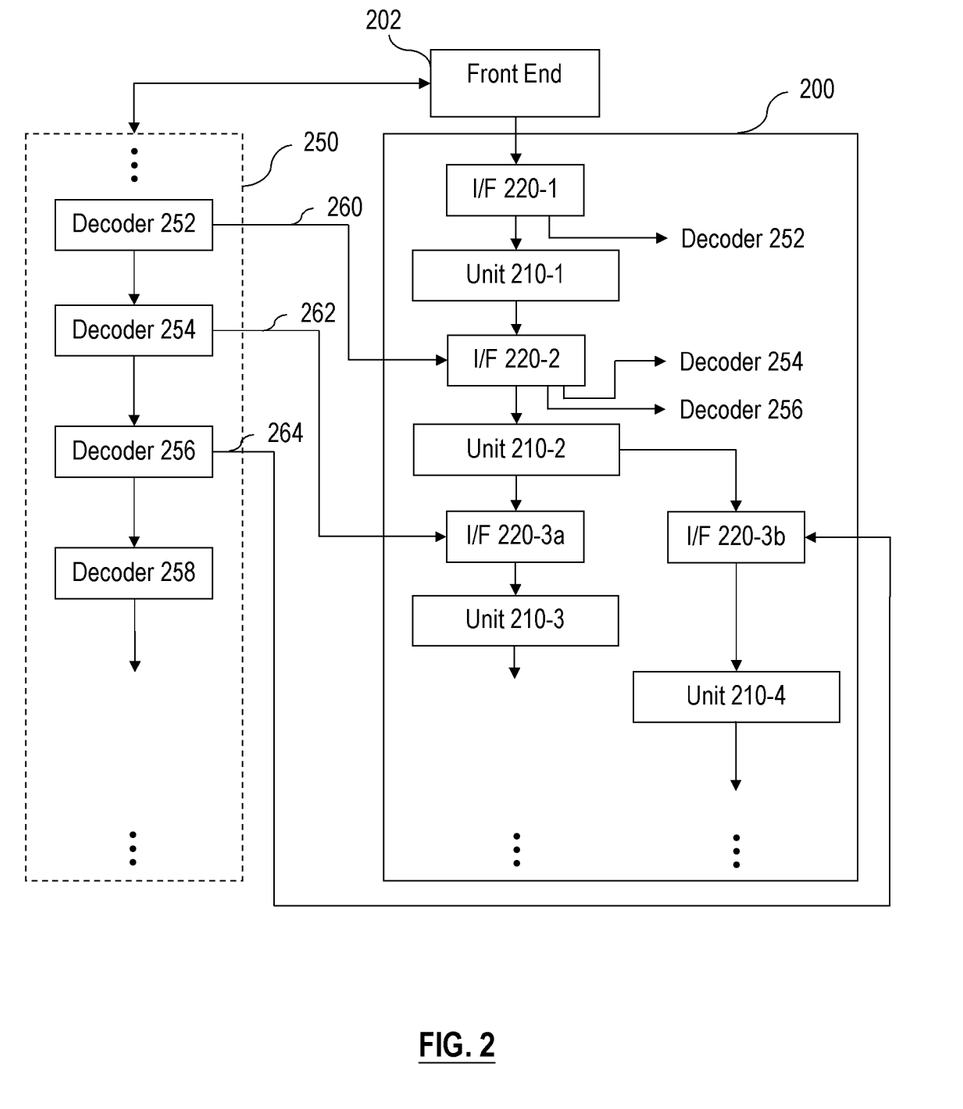
FIG. 2 is a conceptual diagram of a sideband path, along side of a processing pipeline, according to one embodiment of the present invention.

FIG. 2 is a conceptual diagram of a sideband path, 250, along side of a processing pipeline, 200, according to one embodiment of the present invention. Specifically, one embodiment of sideband path 250 includes a number of decoders, such as decoders 252, 254, 256, and 258, to handle the bundles that are interleaved with other types of data in processing pipeline 200. The decoders mainly identify the bundles within the stream of data in the pipeline, manage the flow of and retrieve the information encapsulated within the identified bundles, store the retrieved data in a consistent and predetermined format, enable context switching of processing pipeline 200 via sideband path 250, and grant certain pipeline units access to the data stored in the decoders. The decoders in sideband path 250 are coupled to one another via dedicated connections and do not reside in processing pipeline 200. In other words, these decoders neither take up any stage in processing pipeline 200 nor add any latency to processing pipeline 200.

In one implementation, each of the decoders in sideband path 250 is associated with at least one of pipeline units 210 and monitors the bundle traffic on processing pipeline 200. Subsequent sections will further detail the connectivity and the interactions among a decoder, pipeline units, and pipeline interfaces. Each of these decoders has at least two predetermined lists. One is a list of bundles for that particular decoder to decode, and the other is a list of bundles that the decoder should prevent from continuing to flow down processing pipeline 200. This operation of stopping a bundle from flowing downstream is also referred to as a "kill" operation. If a bundle is neither on the list to be decoded nor on the list to be killed, then the decoder does not perform any operation on that bundle. The bundle simply continues to flow down processing pipeline 200. In one implementation, the topology of all the decoders in sideband path 250 and the associations to pipeline units 210 ("Topology") is maintained. If a new decoder is added or if an existing decoder is removed, here the Topology is updated to reflect the addition or removal. The aforementioned predetermined lists of bundles to decode and to kill are established at individual decoder levels. These predetermined lists together with the Topology govern the flow of the bundles in processing pipeline 200.

As an illustration, suppose according to the Topology, decoder 252 monitors traffic going into pipeline unit 210-1, and decoders 254 and 256 both monitor traffic going into pipeline unit 210-2. Suppose further that decoder 252 is configured to decode state bundles A, B, and C; decoder 254 is configured to decode state bundles B and D; and decoder 256 is configured to decode state bundle C and kill state bundle A. As state bundle A flows down processing pipeline 200, before reaching pipeline unit 210-1, decoder 252 identifies state bundle A from the stream of data in the pipeline and recognizes that state bundle A is on its predetermined list of bundles (i.e., A, B, and C) to decode. Decoder 252 decodes state bundle A, stores a copy of the decoded state bundle A or some portions of state bundle A locally, and does not interfere with state bundle A from proceeding downstream to pipeline unit 210-2 via interface 220-2. In other words, decoder 252 does not assert a signal via signal path 260 to prevent state bundle A from proceeding downstream. Because pipeline unit 210-2 has two different downstream paths, in one implementation, decoders 254 and 256 are configured to monitor state bundles heading towards pipeline unit 210-3 and pipeline unit 210-4, respectively. Referring back to the example, since decoder 254 does not find state bundle A on either its predetermined list of bundles to decode (i.e., B and D) or its predetermined list of bundles to kill, decoder 254 ignores state bundle A and does not interfere with state bundle A from proceeding downstream to pipeline unit 210-3 via interface 220-3a. In other words, decoder 254 does not assert a signal via signal path 262 to prevent state from proceeding downstream. On the other hand, since decoder 256 finds state bundle A on its predetermined list of bundles to kill, decoder 256 asserts a signal to interface 220-3b via signal path 264 to stop bundle A from advancing to pipeline unit 210-4. This mechanism of stopping the downstream flow of selected bundles prevents irrelevant bundles from clogging up processing pipeline 200, especially at the bottom portion of the pipeline.

In addition to monitoring and regulating the flows of the bundles in processing pipeline 200, sideband path 250 enables FE 202 to perform context switching without waiting for the idling condition of processing pipeline 200. As mentioned above, since the decoders in sideband path 250 are connected to one another via dedicated connections, FE 202 can utilize these dedicated connections to switch out the stored data from the decoders, which are the states associated with a currently running process, during a context switch operation and restore these switched out states back to the decoders after the operation is completed. Furthermore, to "switch in" the states associated with a different process, FE 202 can send the state bundles encapsulating these states down processing pipeline 200 after the states associating with the currently running process have been switched out, as mentioned above. Based on the predetermined lists of each decoder in sideband path 250 and the Topology, these state bundles should flow down the intended paths and reach the appropriate decoders, so that the decoders can extract the state information stored in the state bundles, store the decoded state information locally in the decoders, and make available the stored state information to the intended pipeline units. Subsequent sections will further describe the aforementioned dedicated connections in sideband path 250 and the mechanism of facilitating a context switch operation using sideband path 250.

Figure 3:
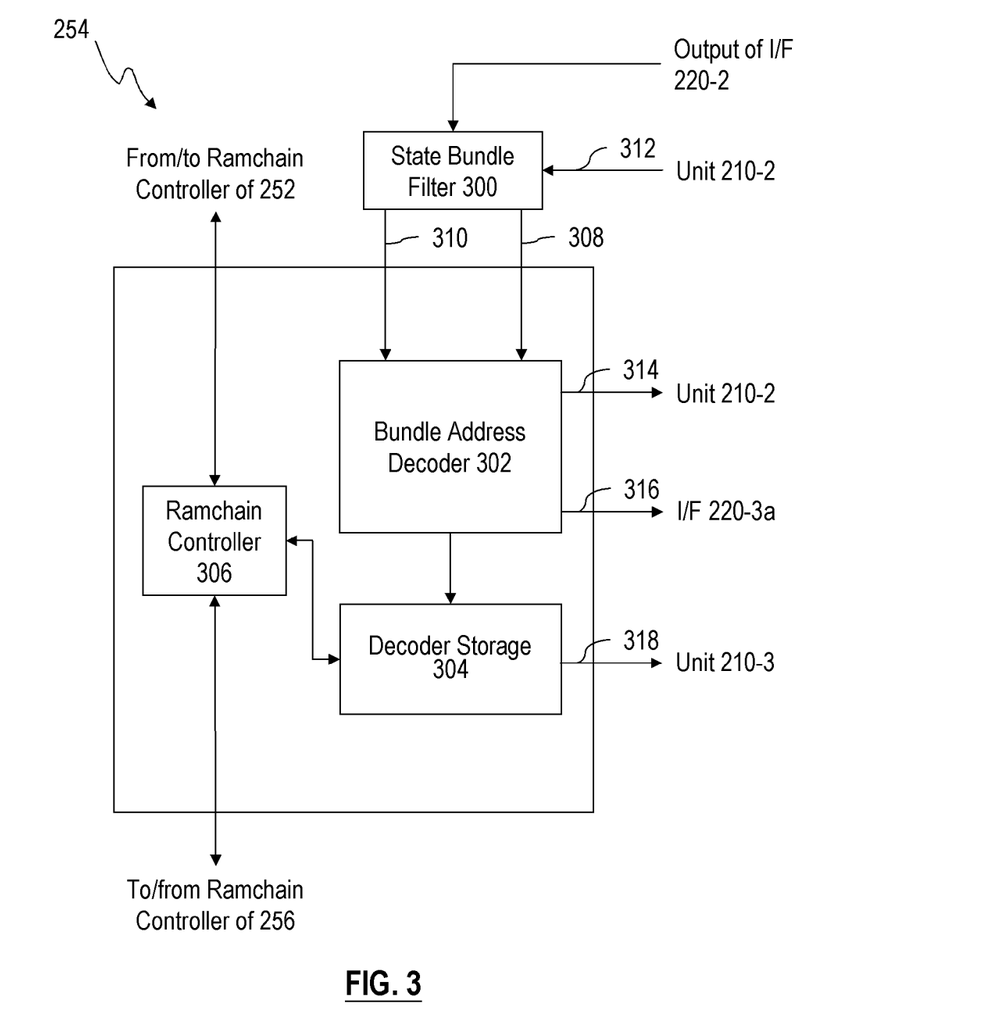
FIG. 3 is a block diagram of a decoder in a sideband path, according to one embodiment of the present invention.

FIG. 3 is a block diagram of decoder 254 in sideband path 250 shown in FIG. 2, according to one embodiment of the present invention. One embodiment of decoder 254 includes bundle address decoder 302, decoder storage 304, and ramchain controller 306. Decoder 254 is further coupled to bundle filter 300, which could alternatively be a part of decoder 254. Bundle filter 300, like pipeline unit 210-2, receives data from the output of interface 220-2 as shown in FIG. 2. This filter is mainly responsible for identifying the bundles from the stream of data flowing down processing pipeline 200. In one implementation, if a particular bundle is detected, bundle filter 300 sends the address field and the data field of the bundle via path 308 and a bundle_valid signal indicating that the bundle is ready to be decoded via path 310 to bundle address decoder 302. This bundle_valid signal is further qualified with a pipeline advancing condition asserted by pipeline unit 210-2 via path 312 to avoid directing decoder 254 to inefficiently and even mistakenly operate on a bundle when processing pipeline 200 is stalled. It is worth noting that for data, including bundles, to advance from a current pipeline stage to the next pipeline stage, the current pipeline stage asserts an advance signal to the interface preceding the next pipeline stage. Using FIG. 2 as an illustration, before the data that are operated on by unit 210-2 can continue downstream, unit 210-2 asserts an advance signal to interface unit 210-3a or interface unit 210-3b.

In one embodiment, on the cycle following the assertion of the bundle_valid signal, bundle address decoder 302 decodes the incoming bundle and either asserts certain signals based on the decoded data or stores the decoded states in decoder storage 304. In particular, if the incoming bundle is a trigger bundle, bundle address decoder 302 asserts a trigger signal for each trigger bundle that it can decode on the same cycle that the trigger bundle is decoded. Thus, using FIG. 2 and FIG. 3 as an illustration, bundle address decoder 302 of decoder 254 decodes a trigger bundle and asserts a trigger signal for pipeline unit 210-2 via path 314 on the same cycle. In addition, bundle address decoder 302 also asserts a kill signal if the incoming bundle matches one of the bundles on the predetermined list of bundles to be killed. In one implementation, this asserted kill signal is logically combined with the advance signal discussed above, such that the bundle is stopped from advancing further at the time it is supposed to advance. Again, using FIG. 2 and FIG. 3 as an illustration, bundle address decoder 302 asserts the kill signal via path 316, which is logically combined with the advance signal from pipeline unit 210-2. This combined signal goes to interface 220-3b, so that the bundle to be killed does not advance to pipeline unit 210-4.

If the incoming bundle is a state bundle and is on the list of bundles to be decoded by decoder 254, bundle address decoder 302 decodes the bundle and stores the decoded state information in decoder storage 304. In one implementation, the entire decoded state bundle is stored. Alternatively, selective fields of the decoded state bundle are stored. The decoded state information is available for use on the cycle following the assertion of the bundle_valid signal. Using FIG. 2 and FIG. 3 as an illustration, the decoded state information in decoder storage 304 is available for pipeline unit 210-3 to access via path 318 on the cycle following the assertion of the bundle_valid signal by bundle filter 300.

Figure 4A:
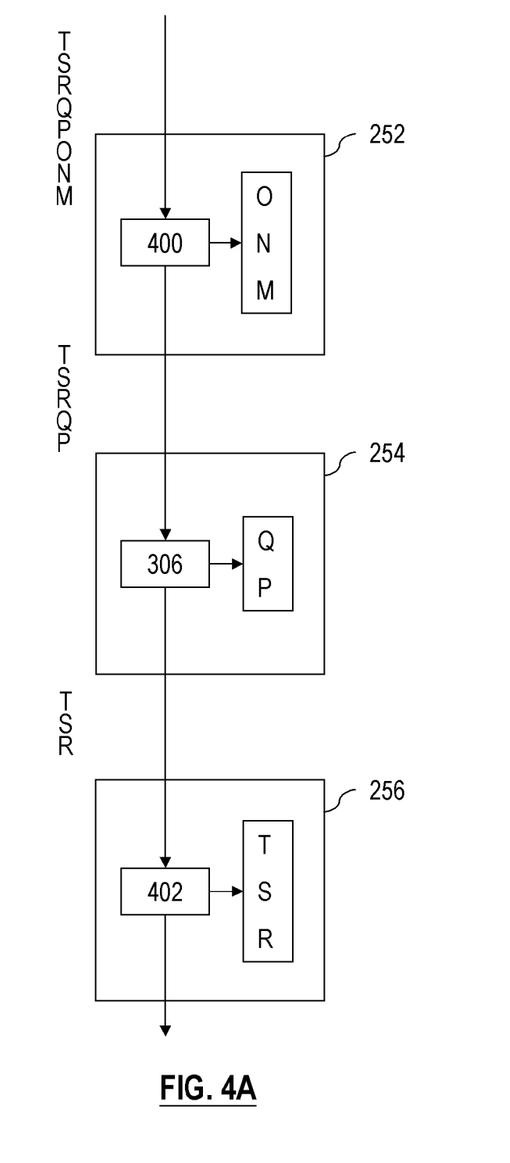
FIG. 4A illustrates a downstream sequence of operations in a ramchain, according to one embodiment of the present invention.

In addition to storing decoded bundles from processing pipeline 200, decoder storage 304 may also store state information from ramchain controller 306. In particular, a ramchain is a dedicated connection chaining up all the decoders in sideband path 250, and this ramchain facilitates context switch operations for processing pipeline 200. To illustrate the operations of the ramchain in a downstream direction, suppose FE 202 of FIG. 2 intends to restore states M, N, and O to pipeline unit 210-2, states P and Q to pipeline unit 210-3, and states R, S, and T to pipeline unit 210-4. Each of decoders 252, 254, and 256 has a predetermined list of states that it decodes and stores, and these stored states are accessible by pipeline units 210-2, 210-3, and 210-4, respectively. Suppose the list of states for decoder 252 includes states M, N, and O; the list for decoder 254 includes states P and Q; and the list for decoder 256 includes states R, S, and T. Suppose further that FE 202 sends the states down the ramchain in the sequence of M, N, O, P, Q, R, S, and T and also a token indicating the number of states on the ramchain, which in this case the number is 8. As shown in FIG. 4A, ramchain controller 400 in decoder 252 takes the first 3 states, stores the states in the decoder storage in the order that decoder 252 receives them, and decrements the number in the token by 3. Similarly, ramchain controllers 306 takes and stores the next 2 states and decrements the number in the token by 2, and ramchain controller 402 takes and stores the last 3 states and decrements the number in the token by 3. When the number in the token reaches 0, all the states that FE 202 intends to restore have been restored.

Figure 4B:
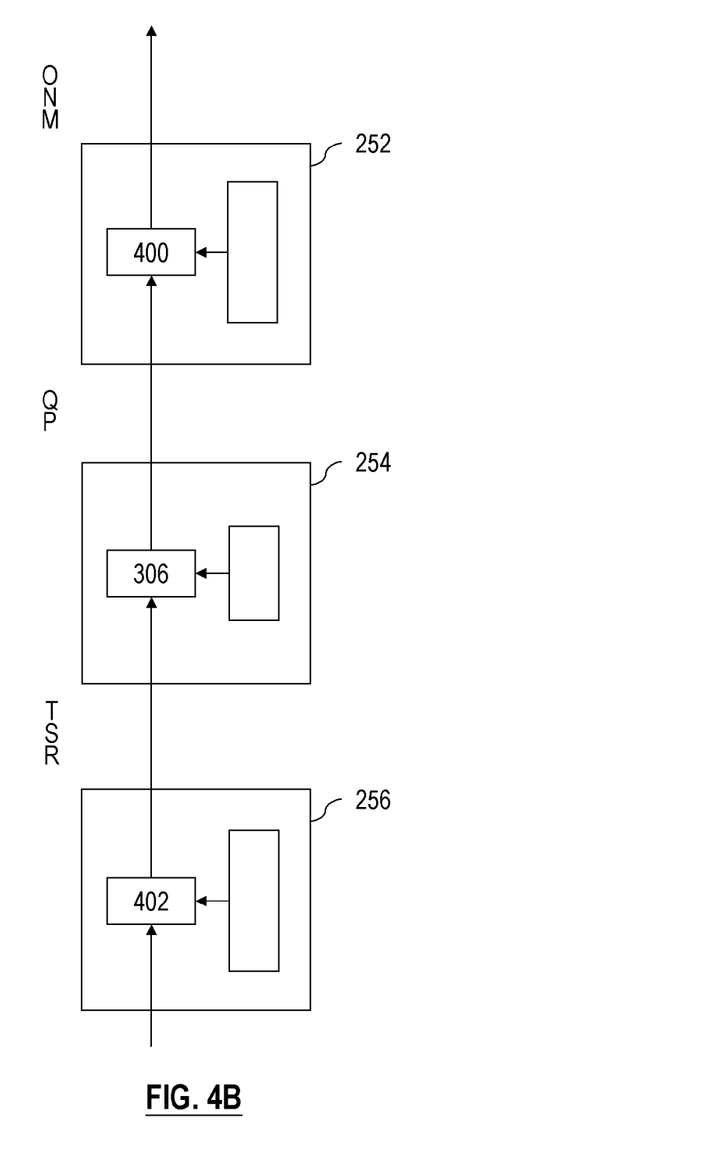
FIG. 4B illustrates a upstream sequence of operations in a ramchain, according to one embodiment of the present invention.
Figure 4C:
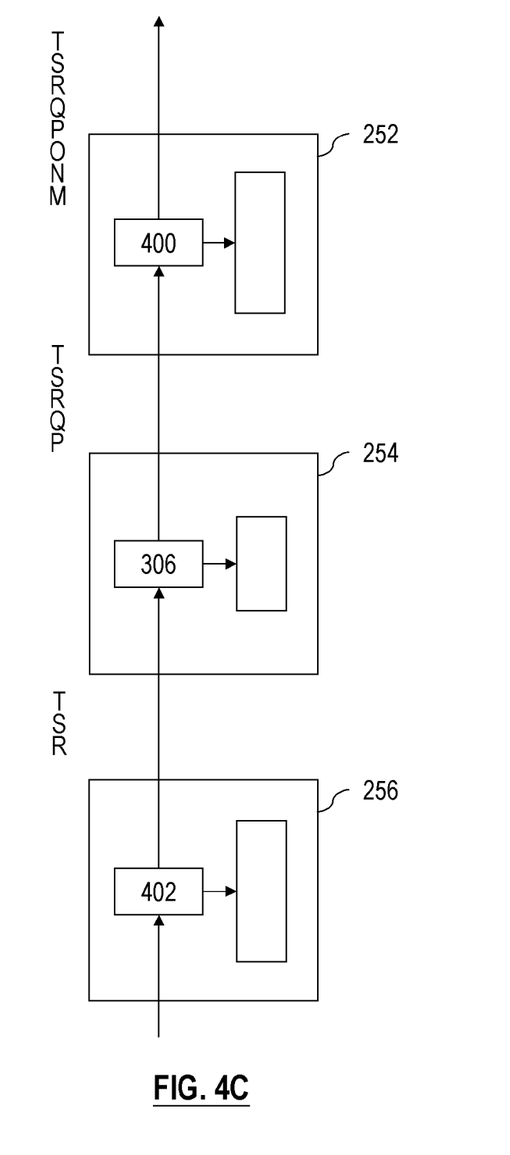
FIG. 4C illustrates an alternative upstream sequence of operations in a ramchain, according to one embodiment of the present invention.

On the other hand, suppose FE 202 of FIG. 2 intends to switch out the states stored in decoders 252, 254, and 256 in a context switch operation. FE 202 sends a token down the ramchain requesting each of the decoders to place its stored state information on the ramchain. As shown in FIG. 4B, after the token reaches ramchain controller 400, the stored states are retrieved in a reversed order from the order of storing the states in the decoder storage. For decoder 252, this means state O is retrieved first, and state M is retrieved last. Similarly, after the token reaches ramchain controller 306, state Q is retrieved first, and state P is retrieved second. Lastly, when the token reaches ramchain controller 402, state T is retrieved first, state R is retrieved last. Alternatively, as shown in FIG. 4C, the states stored in decoders 252, 256, and 256 are retrieved after the token reaches ramchain controller 402. By the time ramchain controller 400 retrieves and places the stored states of decoder 252 on the ramchain, all of the M, N, O, P, Q, R, S, and T states are present and in a reversed sequence from the order they are stored in the decoder storage. It should be apparent to one with ordinary skill in the art to use different buffering mechanisms than the one discussed above for storing and retrieving state information using the ramchain connection without exceeding the scope of the claimed invention.

In one implementation, to reduce the decoders in sideband path 250 described to digital circuitry, the Topology and the flow of bundles are first described in a configuration file using a high level programming language, such as C++. Each instance of the decoder and its connections to the pipeline units need to be properly declared in this configuration file. Also, the bundles to be decoded by a particular decoder are defined in a separate definition file. As discussed above, for uniformity, the definitions of the bundles for each of the decoders will follow certain predefined naming conventions, initialization values, and default values. Each bundle may be further associated with member functions. Then, a global build process that takes all the files mentioned above into account and generates a Verilog module for each decoder in the Topology. This Verilog module typically goes through further verifications before it is finally reduced to a semiconductor device.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A graphics system, comprising:
   a processor;
   a processing pipeline including a plurality of pipeline units, managed by the processor; and
   a plurality of decoders coupled to a connection, wherein:
      each decoder is associated with a first predetermined list of data structures to decode and a second predetermined list of data structures to not process further,
      the processor requests each of the plurality of decoders, having obtained first state information associated with a first process from each of the plurality of pipeline units, to place the first state information on the connection,
      the processor restores the first state information back to the plurality of decoders by placing the first state information on the connection after having switched out second state information associated with a second process from the plurality of decoders, and
      in response to a second data structure associated with a current state of the processing pipeline being on a first predetermined list of data structures to kill, wherein the first predetermined list is associated with a second decoder included in the plurality of decoders, the second decoder asserts a kill signal to prevent the second data structure from flowing to a next stage of the processing pipeline.

2. The graphics system of claim 1, further comprising a local memory, wherein the processor stores the first state information in a first region of the local memory during the processing of the second process.

3. The graphics system of claim 1, wherein if a first data structure in a current stage of the processing pipeline is on a first predetermined list of data structures to decode of a first decoder of the plurality of decoders and contains the second state information, the first decoder decodes and stores the first data structure in a local storage of the first decoder.

4. The graphics system of claim 3, wherein the decoded first data structure stored in the local storage of the first decoder is available for use in a next stage of the processing pipeline.

5. The graphics system of claim 1, wherein if a first data structure on the processing pipeline is on a first predetermined list of data structures to decode of a first decoder of the plurality of decoders and contains trigger information, the first decoder decodes and asserts a trigger signal in the same cycle as the first decoder receives the first data structure.

6. The graphics system of claim 1, wherein the kill signal is logically combined with an advance signal asserted by the current stage of the processing pipeline to generate a combined signal that is asserted to a pipeline interface preceding the next stage of the processing pipeline.

7. The graphics system of claim 6, wherein the combined signal causes the second decoder to prevent the second data structure from flowing to the next stage of the processing pipeline.

8. The graphics system of claim 1, wherein a first decoder of the plurality of the decoders stores a set of the first state information that the processor places on the connection in a local storage based on a predetermined list of states to store and in a first order that the first decoder receives the first state information from the connection.

9. The graphics system of claim 8, wherein upon the request of the processor to place the first state information on the connection, the first decoder retrieves the set of the first state information from the local storage in a second order, which is reversed from the first order.

10. The graphics system of claim 1, wherein the first predetermined list of data structures to decode is different than any of the other first predetermined lists of data structures to decode associated with the other decoders, and wherein the second predetermined list of data structures to not process further is different than any of the other second predetermined lists of data structures to not process further associated with the other decoders.

11. A method for performing a context switch between a first process and a second process operating in a processing pipeline, comprising:
    placing first state information associated with the first process on a connection separate from the processing pipeline, wherein a plurality of decoders coupled to the connection having obtained the first state information from a plurality of pipeline units on the processing pipeline;
    restoring the first state information back to the plurality of decoders by placing the first state information on the connection after having switched out second state information associated with the second process from the plurality of decoders, wherein each decoder is associated with a first predetermined list of data structures to decode and a second predetermined list of data structures to not process further;
    in response to a second data structure associated with a current state of the processing pipeline being on a first predetermined list of data structures to kill, wherein the first predetermined list is associated with a second decoder included in the plurality of decoders, asserting a kill signal to prevent the second data structure from flowing to a next stage of the processing pipeline.

12. The method of claim 11, further comprising decoding and storing a first data structure in a current stage of the processing pipeline, if the first data structure is on a first predetermined list of data structures to decode and contains the second state information.

13. The method of claim 12, further comprising making available the decoded and stored first data structure for use in a next stage of the processing pipeline.

14. The method of claim 11, further comprising asserting a trigger signal in the same cycle as receiving a first data structure, if the first data structure on the processing pipeline is on a first predetermined list of data structures to decode and contains trigger information.

15. The method of claim 11, further comprising logically combining the kill signal with an advance signal asserted by the current stage of the processing pipeline to generate a combined signal that is asserted to a pipeline interface preceding the next stage of the processing pipeline.

16. The method of claim 15, wherein preventing the data structure from flowing comprises receiving the combined signal at a second decoder that, in response to receiving the combined signal, initiating preventing of the second data structure.

17. The method of claim 11, further comprising storing a set of the first state information on the connection in a local storage during the restoring step based on a predetermined list of states to store and in a first order of receiving the first state information from the connection.

18. The method of claim 17, further comprising retrieving the set of the first state information from the local storage in a second order, which is reversed from the first order, during a step of switching out the first state information in preparation for the second state information.

19. The method of claim 11, further comprising maintaining a topology of the plurality of decoders and the connectivity relationships to the plurality of pipeline units in a configuration file.

20. The method of claim 11, wherein the first predetermined list of data structures to decode is different than any of the other first predetermined lists of data structures to decode associated with the other decoders, and wherein the second predetermined list of data structures to not process further is different than any of the other second predetermined lists of data structures to not process further associated with the other decoders.

* * * * *